United States Patent
Lin et al.

(10) Patent No.: US 10,618,600 B2
(45) Date of Patent: Apr. 14, 2020

(54) SPEED-CHANGING METHOD OF BICYCLE

(71) Applicant: Giant Manufacturing Co., Ltd., Taichung (TW)

(72) Inventors: Chung-Wei Lin, Taichung (TW); Min-Chang Chen, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 0 days.

(21) Appl. No.: 15/806,276

(22) Filed: Nov. 7, 2017

(65) Prior Publication Data

US 2018/0127059 A1    May 10, 2018

(30) Foreign Application Priority Data

Nov. 8, 2016 (TW) .............................. 105136217 A (51) Int. Cl.
*B62M 25/08* (2006.01)
*B62M 9/122* (2010.01)
*B62M 9/132* (2010.01)

(52) U.S. Cl.
CPC ............ *B62M 25/08* (2013.01); *B62M 9/122* (2013.01); *B62M 9/132* (2013.01)

(58) Field of Classification Search
CPC ....... B62M 25/08; B62M 9/122; B62M 9/132
See application file for complete search history.

(56) References Cited

U.S. PATENT DOCUMENTS

| | | | |
|---|---|---|---|
| 5,865,454 A | 2/1999 | Campagnolo | |
| 8,712,656 B2 * | 4/2014 | Lee | F16H 61/26 701/60 |
| 8,882,122 B2 | 11/2014 | Emura et al. | |
| 9,302,737 B2 | 4/2016 | Kuroda | |
| 9,487,268 B2 * | 11/2016 | Fukao | B62M 9/122 |
| 9,522,714 B2 * | 12/2016 | Komatsu | B62M 25/08 |
| 9,815,522 B2 * | 11/2017 | Tachibana | B62M 9/123 |

(Continued)

FOREIGN PATENT DOCUMENTS

| | | |
|---|---|---|
| CN | 1485248 | 3/2004 |
| TW | I523793 | 3/2016 |

OTHER PUBLICATIONS

"Search Report of Europe Counterpart Application", dated Mar. 27, 2018, p. 1-p. 7.

*Primary Examiner* — Tinh Dang
(74) *Attorney, Agent, or Firm* — JCIPRNET (57) ABSTRACT

A speed-changing method of bicycle suitable for controlling a gear ratio of a bicycle is provided. The bicycle has a front electronic derailleur, a rear electronic derailleur, a controller, and a controlling switch. The controller stores a gear-ratio table. The speed-changing method of bicycle includes the following steps. The controlling switch is triggered to generate a speed-increasing signal or a laborsaving signal. The controller controls the front and rear electronic derailleurs according to the speed-increasing signal or the laborsaving signal to increase the gear ratio along a speed-increasing path of the gear-ratio table or decrease the gear ratio along a laborsaving path of the gear-ratio table respectively. On the other hand, the front and rear electronic derailleurs are started simultaneously at a first switch point of the speed-increasing path or a second switch point of the laborsaving path, and the first switch point is different from the second switch point.

6 Claims, 3 Drawing Sheets

(56) References Cited

U.S. PATENT DOCUMENTS

| | | | |
|---|---|---|---|
| 9,896,152 B2* | 2/2018 | Yamamoto | B62M 6/45 |
| 2014/0088846 A1 | 3/2014 | Lee | |
| 2014/0290412 A1 | 10/2014 | Emura et al. | |
| 2016/0200396 A1 | 7/2016 | Baumann et al. | |
| 2017/0008465 A1* | 1/2017 | Kasai | B62M 9/122 |

* cited by examiner

| Front chain ring \ Rear chain ring | 11 | 12 | 13 | 14 | 15 | 17 | 19 | 21 | 24 | 28 |
|---|---|---|---|---|---|---|---|---|---|---|
| 34 | 3.09 | 2.83 | 2.62 | 2.43 | 2.27 | 2.00 | 1.79 | 1.62 | 1.42 | 1.21 |
| 50 | 4.55 | 4.17 | 3.85 | 3.57 | 3.33 | 2.94 | 2.63 | 2.38 | 2.08 | 1.79 |

SPEED-CHANGING METHOD OF BICYCLE

CROSS-REFERENCE TO RELATED APPLICATION

This application claims the priority benefit of Taiwan application serial no. 105136217, filed on Nov. 8, 2016. The entirety of the above-mentioned patent application is hereby incorporated by reference herein and made a part of this specification.

BACKGROUND OF THE INVENTION

Field of the Invention

The invention relates to a speed-changing method, and particularly relates to a speed-changing method of bicycle.

Description of Related Art

In recent years, with the flourishing market of bicycles, both advanced bicycles for racing and bicycles for mass public recreation are widely favored by the consumers. Generally, a bicycle has a derailleur for the cyclist to move the chain to different chain rings by actuating the derailleur with the speed-changing lever and to achieve the required gear ratio according to the condition of riding, terrain, weather or other requirements. The derailleur includes a front derailleur and a rear derailleur, and the front derailleur and the rear derailleur are respectively configured to control the locations of the chain on the front chain rings and the rear chain rings. The bicycle may have different types of derailleur according to different frame structures or derailleur cables. Common derailleurs are generally classified into a mechanical derailleur and an electronic derailleur, wherein the electronic derailleur is more laborsaving and faster in switching gear positions and is thus gaining favor with cyclists.

In detail, the speed-changing of bicycle is done by adjusting the locations of the chain on the chain rings, and the result of the speed-changing is related to the gear ratio of the number of teeth of the front gear ring to the number of teeth of the rear gear ring which the chain is located on. Therefore, a gear-ratio table organizing the gear ratios of all front chain rings collocating with all rear chain rings in order helps the cyclist switch the locations of the chain on the chain rings sequentially according to the gear ratio. However, prior speed-changing method is rather complicated as it often requires the cyclist to adjust the controlling switch by hand to have the front derailleur and the rear derailleur switch the locations of the chain on the front chain rings and the rear chain rings.

A speed-changing method using electronic derailleurs that automatically switches the gear ratio according to a predetermined gear-ratio table has been brought to market. A path for switching the gear ratio is generally classified into a speed-increasing path and a laborsaving path. The speed-increasing path achieves a speed-changing result that the final gear ratio is greater than the initial gear ratio by the electronic derailleur switching the locations of the chain on the front chain rings and the rear chain rings according to the predetermined gear-ratio table. The laborsaving path achieves a speed-changing result that the final gear ratio is smaller than the initial gear ratio by the electronic derailleur switching locations of the chain on the front chain rings and the rear chain rings according to the predetermined gear-ratio table. As such, the speed-changing method is simplified. The current speed-changing method for automatically switching the gear ratio starts the front derailleur and the rear derailleur at different timings, but when switching to a particular gear position (also called gear ratio), the locations of the chain on the front chain rings and the rear chain rings needs to be switched by the front derailleur and the rear derailleur. As such, the current speed-changing method for automatically switching the gear ratio has difficulties in shortening the time required for switching the gear ratio and further affects the smoothness of the cyclist's riding experience.

SUMMARY OF THE INVENTION

The invention provides a speed-changing method of bicycle that contributes in shortening the time required for switching the gear ratio and improves the smoothness of the cyclist's riding experience thereby.

The invention provides a speed-changing method of bicycle suitable for controlling a gear ratio of a bicycle. The bicycle has a chain, a plurality of front chain rings, a plurality of rear chain rings, a front electronic derailleur, a rear electronic derailleur, a controller, and a controlling switch. The chain is driven by the front electronic derailleur to move back and forth among the front chain rings and is driven by the rear electronic derailleur to move back and forth among the rear chain rings, and the controller stores a gear-ratio table. The speed-changing method of bicycle includes the following steps. Firstly, the controlling switch is triggered to generate a corresponding signal. Next, the front electronic derailleur and the rear electronic derailleur are controlled by the controller according to the signal. If the signal is a speed-increasing signal, the controller controls the front electronic derailleur and the rear electronic derailleur to move the chain from one of the rear chain rings to another rear chain ring along a speed-increasing path of the gear-ratio table for increasing the gear ratio and controls the front electronic derailleur to move the chain from one of the front chain rings to another front chain ring at the first switch point of the speed-increasing path. If the signal is a laborsaving signal, the controller controls the front electronic derailleur and the rear electronic derailleur to move the chain from one of the rear chain rings to another rear chain ring along a laborsaving path of the gear-ratio table for decreasing the gear ratio and controls the front electronic derailleur to move the chain from one of the front chain rings to another front chain ring at the second switch point of the laborsaving path. The first switch point is different from the second switch point, and the front electronic derailleur and the rear electronic derailleur are started simultaneously at the first switch point or the second switch point.

In an embodiment of the invention, at the first switch point, the front electronic derailleur and the rear electronic derailleur, started simultaneously, respectively moves the chain from one of the front chain rings to another one of the front chain rings within a first time and moves the chain from one of the rear chain rings to another one of the rear chain rings within a second time, and the first time is different from the second time.

In an embodiment of the invention, at the first switch point, the front electronic derailleur and the rear electronic derailleur, started simultaneously, respectively moves the chain from one of the front chain rings to another one of the front chain rings within a first time and moves the chain from one of the rear chain rings to another one of the rear chain rings within a second time, and the first time equals the second time.

In an embodiment of the invention, at the second switch point, the front electronic derailleur and the rear electronic derailleur, started simultaneously, respectively moves the chain from one of the front chain rings to another one of the front chain rings within a third time and moves the chain from one of the rear chain rings to another one of the rear chain rings within a fourth time, and the third time is different from the fourth time.

In an embodiment of the invention, at the second switch point, the front electronic derailleur and the rear electronic derailleur, started simultaneously, respectively moves the chain from one of the front chain rings to another one of the front chain rings within a third time and moves the chain from one of the rear chain rings to another one of the rear chain rings within a fourth time, and the third time equals the fourth time.

In an embodiment of the invention, the chain is located on one of the rear chain rings at the first switch point and the chain is located on another one of the rear chain rings at the second switch point.

In an embodiment of the invention, the aforementioned process of controlling the rear electronic derailleur at the first switch point to move the chain from one of the rear chain rings to another one of the rear chain rings includes moving the chain from one of the rear chain rings with less teeth to another rear chain ring with more teeth along the speed-increasing path.

In an embodiment of the invention, the aforementioned process of controlling the rear electronic derailleur at the second switch point to move the chain from one of the rear chain rings to another rear chain ring includes moving the chain from one of the rear chain rings with more teeth to one of the rear chain rings with less teeth along the laborsaving path.

In an embodiment of the invention, the aforementioned process of controlling the rear electronic derailleur at the first switch point to move the chain from one of the front chain rings to another front chain ring includes moving the chain from one of the front chain rings with less teeth to another front chain ring with more teeth along the speed-increasing path.

In an embodiment of the invention, the aforementioned process of controlling the front electronic derailleur at the second switch point to move the chain from one of the front chain rings to another front chain ring includes moving the chain from one of the front chain rings with more teeth to another front chain ring with less teeth along the laborsaving path.

Based on the above, the speed-changing method of bicycle of the invention is achieved by the controller stored with a gear-ratio table controlling the front electronic derailleur and the rear electronic derailleur to increase or decrease the gear ratio along a speed-increasing path or a laborsaving path of the gear-ratio table according to a speed-increasing signal or a laborsaving signal generated by triggering the controlling switch. Herein, at the first switch point of the speed-increasing path or the second switch point of the laborsaving path, the front electronic derailleur and the rear electronic derailleur are started simultaneously to move the chain from one of the front chain rings to another front chain ring and to move the chain from one of the rear chain rings to another rear chain ring. As such, the time required for switching the gear ratio is shortened and the smoothness of the cyclist's riding experience thereby improves.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Some other embodiments of the invention are provided as follows. It should be noted that the reference numerals and part of the contents of the previous embodiment are used in the following embodiments, in which identical reference numerals indicate identical or similar components, and repeated description of the same technical contents is omitted. Please refer to the description of the previous embodiment for the omitted contents, which will not be repeated hereinafter.

Figure 1:
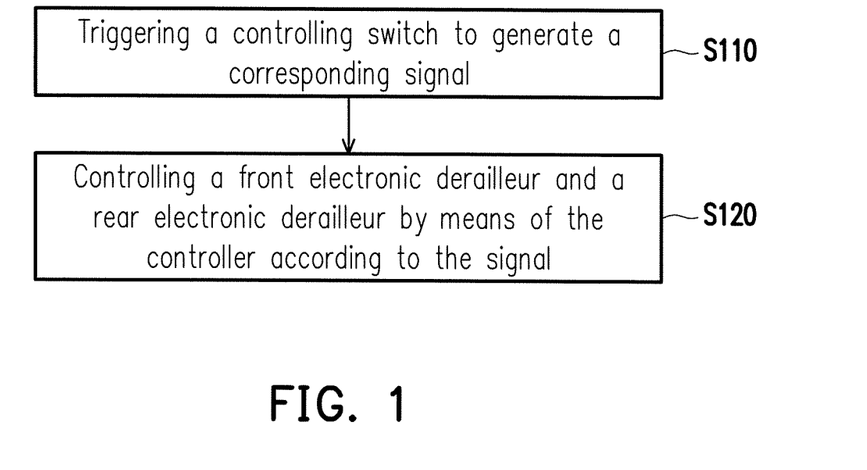
FIG. 1 is a flowchart illustrating a speed-changing method of bicycle according to an embodiment of the invention.

FIG. 1 is a flowchart illustrating a speed-changing method of bicycle according to an embodiment of the invention. Referring to FIG. 1, in this embodiment, the speed-changing method of bicycle includes the following. In step S110, a controlling switch is triggered to generate a corresponding signal. In step S120, a front electronic derailleur and a rear electronic derailleur are controlled by a controller according to the signal. As such, the speed-changing method of bicycle of this embodiment is suitable for controlling a gear ratio of a front chain ring and a rear chain ring of bicycle.

Figure 2:
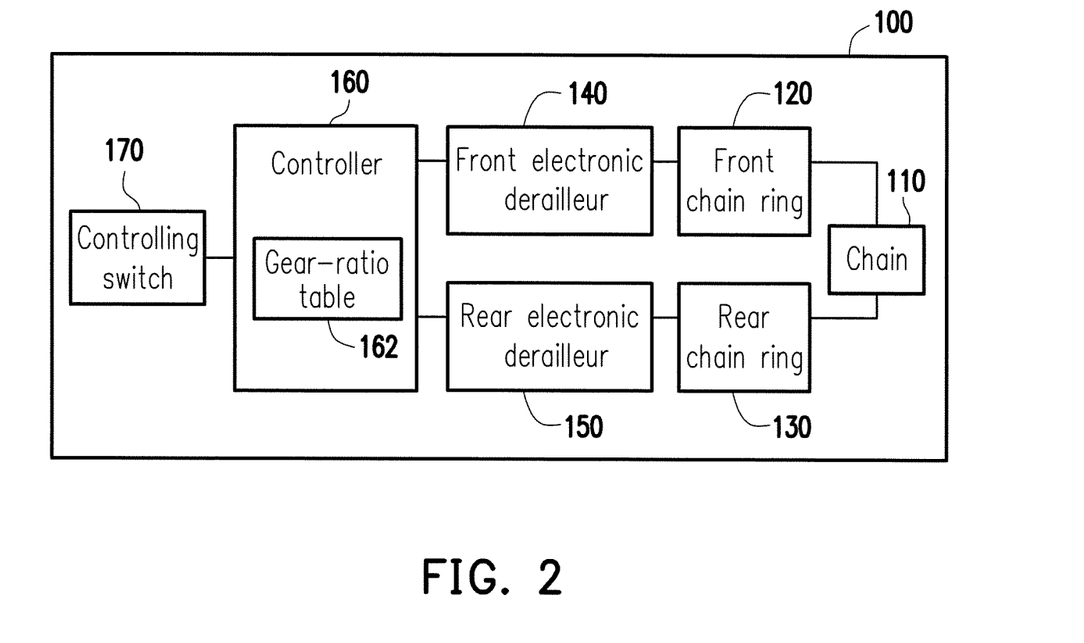
FIG. 2 is a schematic view of a bicycle according to an embodiment of the invention.

FIG. 2 is a schematic view of a bicycle according to an embodiment of the invention. Referring to FIG. 2, in this embodiment, the bicycle 100 has a chain 110, a front chain ring 120, a rear chain ring 130, a front electronic derailleur 140, a rear electronic derailleur 150, a controller 160 and a controlling switch 170, wherein the chain 110 connects the front chain ring 120 and the rear chain ring 130. A number of the front chain ring 120 is at least two, a number of the rear chain ring 130 is plural, and each of the front chain rings 120 and each of the rear chain rings 130 has different number of teeth respectively. In detail, when a cyclist is riding the bicycle and a gear ratio is unchanged, the chain 110 is located on one of the front chain rings 120 and one of the rear chain rings 130, and the gear ratio is calculated from the front chain ring 120 and the rear chain ring 130 which the chain 110 is located on.

The front electronic derailleur 140 is disposed corresponding to the two front chain rings 120, the rear electronic derailleur 150 is disposed corresponding to the rear chain rings 130, and the chain 110 is coupled to the front electronic derailleur 140 and the rear electronic derailleur 150. Therefore, the chain 110 can be driven by the front electronic derailleur 140 to move back and forth among the two front chain rings 120 or driven by the rear electronic derailleur 150 to move back and forth among the rear chain rings 130. On the other hand, the front electronic derailleur 140 and the rear electronic derailleur 150 are respectively electronically coupled to the controller 160 via wire or wireless, and the controller 160 is electronically coupled to the controlling switch 170 via wire or wireless. Generally speaking, the controlling switch 170 may be disposed on a speed-changing lever, but the invention is not limited thereto. The controlling switch 170 may also be disposed on a bicycle lever, a stem or a bicycle frame. As such, the cyclist presses or touches the controlling switch 170 to generate a corresponding signal, and the signal is transmitted to the controller 160. At the same time, the controller 160 controls the front electronic derailleur 140 and the rear electronic derailleur 150 according to the signal to move the chain 110 from the front chain ring 120 or rear chain ring 130 which the chain 110 was originally located on to another front chain ring 120 or rear chain ring 130 so as to switch the gear ratio.

Figure 3:
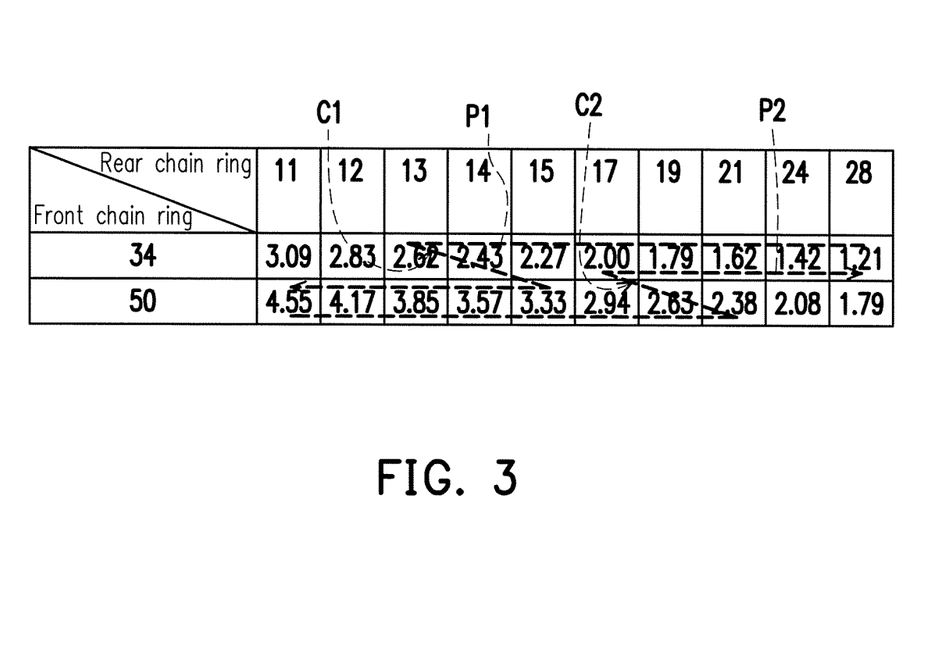
FIG. 3 is a schematic view illustrating switching of a gear ratio according to an embodiment of the invention.

FIG. 3 is a schematic view illustrating switching of a gear ratio according to an embodiment of the invention. Referring to FIG. 2 and FIG. 3, in this embodiment, the controller 160 stores a predetermined gear-ratio table 162. As such, the controller 160 controls the front electronic derailleur 140 and the rear electronic derailleur 150 according to the signal generated by the controlling switch 170 to move the chain 110 to a front chain ring 120 having a particular number of teeth and a rear chain ring having a particular number of teeth according to the gear-ratio table 162 so as to achieve one of the gear ratios determined in the gear-ratio table 162. The bicycle 100 having two front chain rings 120 and ten rear chain rings 130 is taken as an example herein, wherein the two front chain rings 120 respectively has 34 teeth and 50 teeth, the rear chain rings 130 respectively has 11 teeth, 12 teeth, 13 teeth, 14 teeth, 15 teeth, 17 teeth, 19 teeth, 21 teeth, 24 teeth and 28 teeth, and the gear-ratio table 162 is calculated from the number of teeth of each of the front chain rings 120 and the number of teeth of each of the rear chain rings 130, but the invention is not limited thereto. In other embodiments, the number of the front chain rings 120 and the rear chain rings 130 and the number of teeth of the front chain rings 120 and the rear chain rings 130 may be adjusted according to the practical requirements, and a different gear-ratio table may be obtained thereby.

The signal generated by the cyclist's pressing or touching the controlling switch 170 is generally classified into a speed-increasing signal and a laborsaving signal. For example, when the chain 110 is located on a front chain ring 120 with 34 teeth and a rear chain ring 130 with 28 teeth and the signal is a speed-increasing signal, the controller 130 receiving the speed-increasing signal may control the rear electronic derailleur 150 to move the chain 110 to a rear chain ring 130 with 24 teeth along a speed-increasing path P1 so as to increase the gear ratio from 1.21 to 1.42, or may continue to move the chain 110 to a rear chain ring 130 with less teeth along the speed-increasing path P1 so as to further increase the gear ratio. In this embodiment, the speed-increasing path P1 has a first switch point C1, which is predetermined as at a gear position wherein the chain 110 is located on a front chain ring 120 with 34 teeth and a rear chain ring 130 with 13 teeth, with a gear ratio of 2.62. When the chain 110 is kept on the front chain ring 120 with 34 teeth, and the rear electronic derailleur 150 moves the chain 110 to a rear chain ring 130 with 13 teeth along the speed-increasing path P1 and reaches the first switch point C1, the controller 130 having received the speed-increasing signal starts the front electronic derailleur 140 and the rear electronic derailleur 150 simultaneously so as to control the front electronic derailleur 140 to move the chain 110 from a front chain ring 120 with 34 teeth to a front chain ring 120 with 50 teeth and to control the rear electronic derailleur 150 to move the chain 110 from a rear chain ring 130 with 13 teeth to a rear chain ring 130 with 15 teeth, so that the gear ratio increases from 2.62 to 3.33. In other words, at the first switch point C1, since the chain 110 is moved from a front chain ring 120 with less teeth to a front chain ring 120 with more teeth by the front electronic derailleur 140 and a gap between the number of teeth of the two front chain rings 120 is rather wide, the rear electronic derailleur 150 firstly moves the chain 110 from a rear chain ring 130 with less teeth to a rear chain ring 130 with more teeth to avoid a sudden increase of gear ratio.

After the chain 110 is moved from the front chain ring 120 with 34 teeth to the front chain ring 120 with 50 teeth, the controller 160 may control the rear electronic derailleur 150 to move the chain 110 from a rear chain ring 130 with 15 teeth along the speed-increasing path P1 to a rear chain ring 130 with 14 teeth to 11 teeth in order, so that the gear ratio increases in order from 3.33 to 3.57, 3.85, 4.17 and 4.55. In brief, since the front electronic derailleur 140 and the rear electronic derailleur 150 are controlled by the controller 160 according to the speed-increasing signal generated by the controlling switch 170, and the chain 110 moves back and forth among the two front chain rings 120 and/or moves back and forth among the rear chain rings 130 along the speed-increasing path P1 according to the gear-ratio table 162, the gap between the numbers of teeth of two adjacent gear positions is narrowed, so that a rotating speed of the pedals does not decrease suddenly and a feeling of frustration during pedaling is thereby avoided.

On the contrary, when the chain 110 is located on a front chain ring 120 with 50 teeth and a rear chain ring 130 with 11 teeth and the signal is a laborsaving signal, the controller 130 receiving the laborsaving signal may control the rear electronic derailleur 150 to move the chain 110 to a rear chain ring 130 with 12 teeth along a laborsaving path P2 different from the speed-increasing path P1 so as to decrease the gear ratio from 4.55 to 4.17, or may continue to move the chain 110 to a rear chain ring 130 with more teeth along the laborsaving path P2 so as to further decrease the gear ratio. In this embodiment, the laborsaving path P2 has a second switch point C2, which is predetermined to be at a gear position wherein the chain 110 is located on a front chain ring 120 with 50 teeth and a rear chain ring 130 with 21 teeth, with a gear ratio of 2.38. When the chain 110 is kept on the front chain ring 120 with 50 teeth, and the rear electronic derailleur 150 moves the chain 110 to a rear chain ring 130 with 21 teeth along the laborsaving path P2 and reaches the second switch point C2, the controller 130 having received the laborsaving signal starts the front electronic derailleur 140 and the rear electronic derailleur 150 simultaneously so as to control the front electronic derailleur 140 to move the chain 110 from the front chain ring 120 with 50 teeth to a front chain ring 120 with 34 teeth and to control the rear electronic derailleur 150 to move the chain 110 from the rear chain ring 130 with 21 teeth to a rear chain ring 130 with 17 teeth, so that the gear ratio decreases from 2.38 to 2. In other words, at the second switch point C2, since the chain 110 is moved from a front chain ring 120 with more teeth to a front chain ring 120 with less teeth by the front electronic derailleur 140 and a gap between the numbers of teeth of the two front chain rings 120 is rather wide, the rear electronic derailleur 150 firstly moves the chain 110 from a rear chain ring 130 with more teeth to a rear chain ring 130 with less teeth to avoid a sudden decrease of gear ratio.

After the chain 110 is moved from the front chain ring 120 with 50 teeth to the front chain ring 120 with 34 teeth, the controller 160 may control the rear electronic derailleur 150 to move the chain 110 from a rear chain ring 130 with 17 teeth along the laborsaving path P2 to a rear chain ring 130 with 19 teeth, 21 teeth, 24 teeth and 28 teeth in order, so that the gear ratio decreases in order from 2 to 1.79, 1.62, 1.42 and 1.21. In brief, since the front electronic derailleur 140 and the rear electronic derailleur 150 are controlled by the controller 160 according to the laborsaving signal generated by the controlling switch 170, and the chain 110 moves back and forth among the two front chain rings 120 and/or moves back and forth among the rear chain rings 130 along the laborsaving path P2 according to the gear-ratio table 162, the gap between the numbers of teeth of two adjacent gear positions is narrowed, so that a rotating speed of the cyclist's pedals does not increase suddenly due to sudden decrease of the gear ratio and a feeling of falling during pedaling is thereby avoided.

According to the above descriptions, the first switch point C1 is different from the second switch point C2. Furthermore, the chain 110 is located on one of the rear chain rings 130 at the first switch point C1 and the chain 110 is located on another one of the rear chain rings 130 at the second switch point C2. On the other hand, at the first switch point C1 or the second switch point C2, the front electronic derailleur 140 and the rear electronic derailleur 150 are started simultaneously to move the chain 110 from one of the front chain rings 120 to another front chain ring 120 and to move the chain 110 from one of the rear chain rings 130 to another rear chain ring 130. As such, the time required for switching the gear ratio is shortened and the smoothness of the cyclist's riding experience thereby improves.

Furthermore, considering the difference between a pitch between two adjacent front chain rings 120 and a pitch between two adjacent rear chain rings 130, and considering the change of tension during the movement of the chain 110 between the chain rings (such as between two front chain rings 120 or between two rear chain rings 130), starting the front electronic derailleur 140 and the rear electronic derailleur 150 simultaneously at the first switch point C1 or the second switch point C2 to move the chain 110 from one of the front chain rings 120 to another front chain ring 120 and from one of the rear chain rings 130 to another rear chain ring 130 contributes in improving the reliability and smoothness when switching the gear position and avoids the chain from falling off. In comparison, if the front electronic derailleur and the rear electronic derailleur are not started simultaneously at the same switch point to move the chain from one of the front chain rings to another front chain ring and from one of the rear chain rings to another rear chain ring, the timing for moving the chain between the chain rings (such as between two front chain rings or between two rear chain rings) is not under accurate control when moving the chain. As such, the reliability and smoothness when switching the gear position decrease and the chain may even fall off.

It should be particularly noted that, during the process of the front electronic derailleur 140 and the rear electronic derailleur 150 moving the locations of the chain 110 on the two front chain rings 120 and the rear chain rings 130 along the speed-increasing path P1 for increasing the gear ratio, if the controller 160 receives a laborsaving signal, under the premise that the front electronic derailleur 140 is left unchanged, the controller 160 controls the rear electronic derailleur 150 to move the chain 110 from a rear chain ring 130 with less teeth to a rear chain ring 130 with more teeth until the chain 110 complies with the laborsaving path P2. On the contrary, during the process of the front electronic derailleur 140 and the rear electronic derailleur 150 moving the locations of the chain 110 on the two front chain rings 120 and the rear chain rings 130 along the laborsaving path P2 for decreasing the gear ratio, if the controller 160 receives a speed-increasing signal, under the premise that the front electronic derailleur 140 is left unchanged, the controller 160 controls the rear electronic derailleur 150 to move the chain 110 from a rear chain ring 130 with more teeth to a rear chain ring 130 with less teeth until the chain 110 complies with the speed-increasing path P1.

Figure 4:
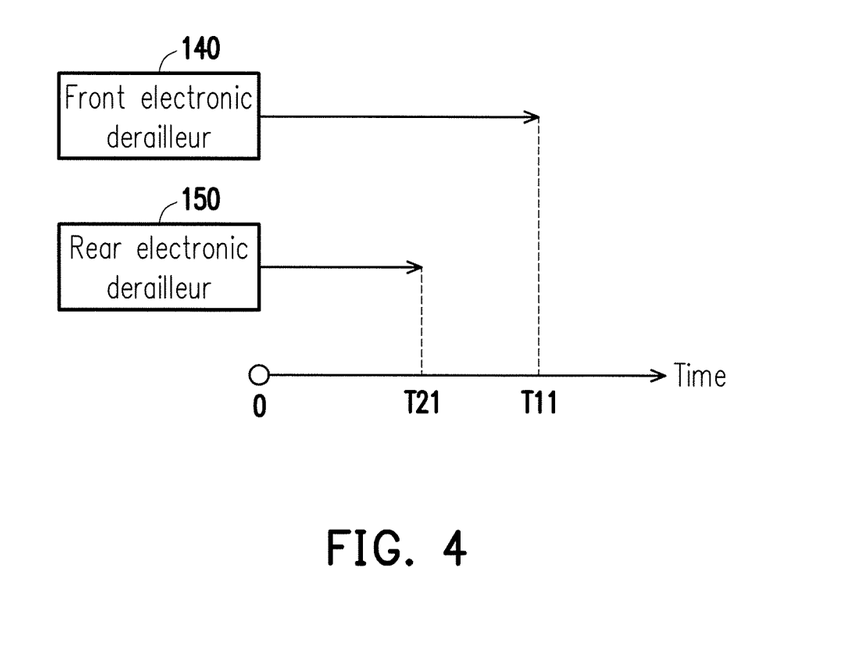
FIG. 4 is a timing diagram illustrating acting of a front electronic derailleur and a rear electronic derailleur at a first switch point of a speed-increasing path.

FIG. 4 is a timing diagram illustrating acting of a front electronic derailleur and a rear electronic derailleur at a first switch point of a speed-increasing path. Referring to FIG. 2 to FIG. 4, at the first switch point C1, the front electronic derailleur 140 and the rear electronic derailleur 150 are started simultaneously. For example, the front electronic derailleur 140 moves the chain 110 from a front chain ring 120 with 34 teeth to a front chain ring 120 with 50 teeth, and the rear electronic derailleur 150 moves the chain 110 from a rear chain ring 130 with 13 teeth to a rear chain ring 130 with 15 teeth passing by a rear chain ring 130 with 14 teeth. A time required for the front electronic derailleur 140 to move the chain 110 from the front chain ring 120 with 34 teeth to the front chain ring 120 with 50 teeth is a first time T11, and a time required for the rear electronic derailleur 150 to move the chain 110 from the rear chain ring 130 with 13 teeth to a rear chain ring 130 with 15 teeth is a second time T21, wherein the first time T11 is longer than the second time T21. In other words, the time required for the rear electronic derailleur 150 to move the chain 110 from the rear chain ring 130 with 13 teeth to a rear chain ring 130 with 15 teeth is shorter than the time required for the front electronic derailleur 140 to move the chain 110 from the front chain ring 120 with 34 teeth to the front chain ring 120 with 50 teeth. As such, the chain 110 does not move to the front chain ring 120 with 50 teeth before moving to the rear chain ring 130 with 15 teeth, so a feeling of frustration during pedaling due to sudden increase of the gear ratio is avoided.

Figure 5:
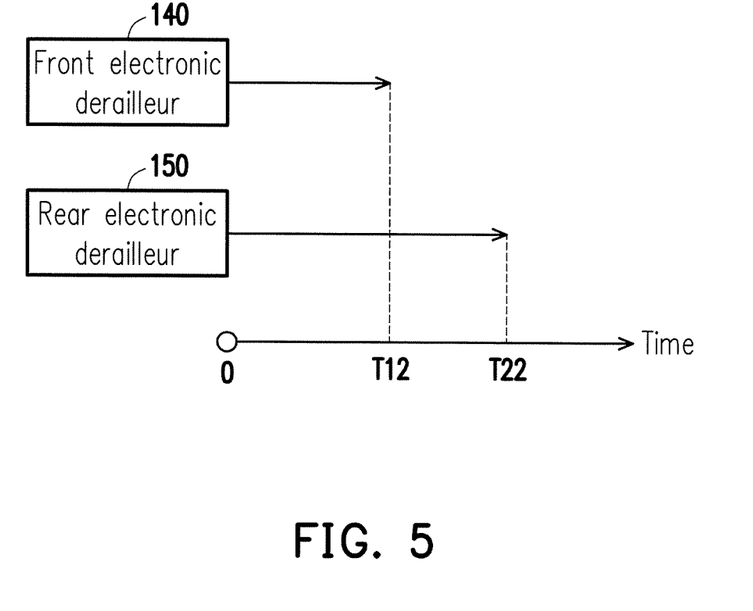
FIG. 5 is a timing diagram illustrating acting of a front electronic derailleur and a rear electronic derailleur at a second switch point of a laborsaving path.

FIG. 5 is a timing diagram illustrating acting of a front electronic derailleur and a rear electronic derailleur at a second switch point of a laborsaving path. Referring to FIG. 2, FIG. 3 and FIG. 5, at the second switch point C2, the front electronic derailleur 140 and the rear electronic derailleur 150 are started simultaneously. For example, the front electronic derailleur 140 moves the chain 110 from a front chain ring 120 with 50 teeth to a front chain ring 120 with 34 teeth, and the rear electronic derailleur 150 moves the chain 110 from a rear chain ring 130 with 21 teeth to a rear chain ring 130 with 17 teeth passing by a rear chain ring 130 with 19 teeth. A time required for the front electronic derailleur 140 to move the chain 110 from the front chain ring 120 with 50 teeth to the front chain ring 120 with 34 teeth is a third time T12, and a time required for the rear electronic derailleur 150 to move the chain 110 from the rear chain ring 130 with 21 teeth to a rear chain ring 130 with 17 teeth is a fourth time T22, wherein the third time T12 is shorter than the fourth time T22. In other words, the time required for the front electronic derailleur 140 to move the chain 110 from the front chain ring 120 with 50 teeth to the front chain ring 120 with 34 teeth is shorter than the time required for the rear electronic derailleur 150 to move the chain 110 from the rear chain ring 130 with 21 teeth to a rear chain ring 130 with 17 teeth. As such, the chain 110 does not move to the rear chain ring 130 with 17 teeth before moving to the front chain ring 120 with 34 teeth, so a feeling of frustration during pedaling due to sudden increase of the gear ratio is avoided.

In practical, a time required respectively for the front electronic derailleur 140 to move the chain 110 from one of the front chain rings 120 to another front chain ring 120 and for the rear electronic derailleur 150 to move the chain 110 from one of the rear chain rings 130 to another rear chain ring 130 may be controlled by an actuator (such as a motor). In other embodiments, at the first switch point C1, the first time and the second time required for the front electronic derailleur 140 and the rear electronic derailleur 150, which are started simultaneously, to respectively move the chain 110 from the front chain ring 120 with 34 teeth to the front chain ring 120 with 50 teeth and to move the chain 110 from the rear chain ring 130 with 13 teeth to the rear chain ring 130 with 15 teeth passing by the rear chain ring 130 with 14 teeth may be equal. On the other hand, at the second switch point C2, the third time and the fourth time required for the front electronic derailleur 140 and the rear electronic derailleur 150, which are started simultaneously, to respectively move the chain 110 from the front chain ring 120 with 50 teeth to the front chain ring 120 with 34 teeth and to move the chain 110 from the rear chain ring 130 with 21 teeth to the rear chain ring 130 with 17 teeth may be equal.

In sum of the above, the speed-changing method of the invention is achieved by the controller stored with a gear-ratio table controlling the front electronic derailleur and the rear electronic derailleur to increase or decrease the gear ratio along a speed-increasing path or a laborsaving path of the gear-ratio table according to a speed-increasing signal or a laborsaving signal generated by triggering the controlling switch. Herein, at the first switch point of the speed-increasing path or the second switch point of the laborsaving path, the front electronic derailleur and the rear electronic derailleur are started simultaneously to move the chain from one of the front chain rings to another front chain ring and to move the chain from one of the rear chain rings to another rear chain ring. As such, the time required for switching the gear ratio is shortened and the smoothness of the cyclist's riding experience thereby improves.

On the other hand, since the front electronic derailleur and the rear electronic derailleur are controlled by the controller according to the speed-increasing signal generated by the controlling switch, and the chain moves back and forth among the two front chain rings and/or moves back and forth among the rear chain rings along the speed-increasing path according to the gear-ratio table, the gap between the numbers of teeth of two adjacent gear positions is narrowed, so that a rotating speed of the pedals does not decrease suddenly and a feeling of frustration during pedaling is thereby avoided. On the contrary, since the front electronic derailleur and the rear electronic derailleur are controlled by the controller according to the laborsaving signal generated by the controlling switch, and the chain moves back and forth among the two front chain rings and/or moves back and forth among the rear chain rings along the laborsaving path according to the gear-ratio table, the gap between the numbers of teeth of two adjacent gear positions is narrowed, so that a rotating speed of the cyclist's pedals does not increase suddenly due to sudden decrease of the gear ratio and a feeling of falling during pedaling is thereby avoided.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A speed-changing method of bicycle, the bicycle has a chain, a plurality of front chain rings, a plurality of rear chain rings, a front electronic derailleur, a rear electronic derailleur, a controller and a controlling switch, the chain is driven by the front electronic derailleur to move back and forth among the front chain rings and is driven by the rear electronic derailleur to move back and forth among the rear chain rings, and the controller stores a gear-ratio table, the speed-changing method of bicycle comprises:

triggering the controlling switch to generate a corresponding signal; and controlling the front electronic derailleur and the rear electronic derailleur by means of the controller according to the signal, if the signal is a speed-increasing signal, the controller controls the front electronic derailleur and the rear electronic derailleur to move the chain from one of the rear chain rings to another one of the rear chain rings along a speed-increasing path of the gear-ratio table for increasing the gear ratio and controls the front electronic derailleur to move the chain from one of the front chain rings to another one of the front chain rings at a first switch point of the speed-increasing path, if the signal is a laborsaving signal, the controller controls the front electronic derailleur and the rear electronic derailleur to move the chain from one of the rear chain rings to another one of the rear chain rings along a laborsaving path of the gear-ratio table for decreasing the gear ratio and controls the front electronic derailleur to move the chain from one of the front chain rings to another one of the front chain rings at a second switch point of the laborsaving path, wherein the first switch point is different from the second switch point, and the front electronic derailleur and the rear electronic derailleur are started simultaneously at the first switch point or the second switch point, wherein at the first switch point, the front electronic derailleur and the rear electronic derailleur are started simultaneously, the front electronic derailleur moves the chain from one of the front chain rings to another one of the front chain rings within a first time period and the rear electronic derailleur moves the chain from one of the rear chain rings to another one of the rear chain rings within a second time period, wherein at the second switch point, the front electronic derailleur and the rear electronic derailleur are started simultaneously, the front electronic derailleur moves the chain from one of the front chain rings to another one of the front chain rings within a third time period and the rear electronic derailleur moves the chain from one of the rear chain rings to another one of the rear chain rings within a fourth time period, the first time period is longer than the second time period, and the third time period is shorter than the fourth time period.

2. The speed-changing method of bicycle according to claim 1, wherein the chain is located on one of the rear chain rings at the first switch point and the chain is located on another one of the rear chain rings at the second switch point.

3. The speed-changing method of bicycle according to claim 1, wherein the step of controlling the rear electronic derailleur at the first switch point to move the chain from one of the rear chain rings to another one of the rear chain rings comprises moving the chain from one of the rear chain rings with less teeth to one of the rear chain rings with more teeth along the speed-increasing path.

4. The speed-changing method of bicycle according to claim 1, wherein the step of controlling the rear electronic derailleur at the second switch point to move the chain from one of the rear chain rings to another one of the rear chain rings comprises moving the chain from one of the rear chain rings with more teeth to one of the rear chain rings with less teeth along the laborsaving path.

5. The speed-changing method of bicycle according to claim 1, wherein the step of controlling the front electronic derailleur at the first switch point to move the chain from one of the front chain rings to another one of the front chain rings comprises moving the chain from one of the front chain rings with less teeth to one of the front chain rings with more teeth along the speed-increasing path.

6. The speed-changing method of bicycle according to claim 1, wherein the step of controlling the front electronic derailleur at the second switch point to move the chain from one of the front chain rings to another one of the front chain rings comprises moving the chain from one of the front chain rings with more teeth to one of the front chain rings with less teeth along the laborsaving path.

* * * * *